United States Patent [19]

Meseha et al.

[11] Patent Number: 5,733,500
[45] Date of Patent: Mar. 31, 1998

[54] MOLTEN METAL DEGASSING AND FILTERING APPARATUS

[75] Inventors: George M. Meseha, Salem; Fausto Tavares, Norwich, both of Conn.

[73] Assignee: Phelps Dodge Industries, Inc., Phoenix, Ariz.

[21] Appl. No.: 612,277

[22] Filed: Mar. 7, 1996

[51] Int. Cl.$^6$ .................................................. C22B 9/02
[52] U.S. Cl. ........................ 266/208; 75/411; 75/648; 266/227
[58] Field of Search ........................... 266/208, 227; 75/648, 411

[56] References Cited

U.S. PATENT DOCUMENTS

| | | | |
|---|---|---|---|
| 3,689,048 | 9/1972 | Foulard et al. | 75/648 |
| 4,277,281 | 7/1981 | Weber et al. | 75/411 |
| 4,472,195 | 9/1984 | Gupta et al. | 75/552 |
| 5,037,471 | 8/1991 | Iwamura et al. | 75/648 |
| 5,183,486 | 2/1993 | Gatten et al. | 55/159 |

FOREIGN PATENT DOCUMENTS

| | | | |
|---|---|---|---|
| 35966 | 8/1985 | Japan | 266/208 |

*Primary Examiner*—Melvyn Andrews
*Attorney, Agent, or Firm*—Fish & Neave; Robert R. Jackson; G. Victor Treyz

[57] ABSTRACT

Molten metal (e.g., on its way to a continuous casting machine for forming a bar that will be rolled into a rod to be drawn down to wire) is filtered to remove particulate impurities by passing it through at least one and preferably several ceramic filters. In addition, the molten metal is degassed by injecting a flushing gas into the metal through one or more porous plugs in the bottom of the chamber through which the molten metal flows. A partial vacuum column above each porous plug is used to help pull gas up through and out of the metal.

15 Claims, 1 Drawing Sheet

MOLTEN METAL DEGASSING AND FILTERING APPARATUS

BACKGROUND OF THE INVENTION

This invention relates to methods and apparatus for degassing and filtering molten metals such as copper, particularly for use in a continuous casting process.

It is important in some metal casting processes to remove gaseous and particulate impurities from the molten metal to be cast. Copper wire, for example, is typically made by drawing down copper rod that has been rolled from a continuously cast copper bar. Gas that is not removed from the copper prior to casting may result in voids that increase the difficulty of satisfactorily drawing the wire and/or that lead to more wire breakage. Particulate impurities that are not removed prior to casting may also increase the difficulty of drawing the wire, decrease conductivity and ductility, and increase wire breakage.

Various molten metal degassing and filtering techniques are known in the art, but each of the known techniques is believed to have certain shortcomings. For example, some of the known techniques involve introducing flushing gas into the molten metal through apertured pipes. Bubbles of the flushing gas are intended to join and/or react with gas already present in the molten metal and thereby carry the pre-existing gas out of the metal. However, for a given quantity of flushing gas, the use of apertured pipes tends to produce relatively small numbers of relatively large flushing gas bubbles. It would be preferable, for more complete dispersion of the flushing gas throughout the molten metal, as well as for better utilization of the flushing gas, to have larger numbers of smaller bubbles.

As another example of shortcomings of the known molten metal degassing and filtering techniques, it is known to apply varying degrees of vacuum to the molten metal to suction or vacuum gas impurities out of the metal. The known techniques for applying relatively high vacuum necessitate expensive and complicated vessels for holding the metal being vacuumed so that excessive ambient air does not inadvertently leak into the vessel. High vacuum has also tended to be associated with batch processing of molten metal. It is difficult to subject a continuous flow of molten metal to a high vacuum because the vacuum tends to work against the molten metal flow. Low vacuum, on the other hand, tends to be of less benefit. It may also be desirable to protect the free surface of the molten metal with a gaseous atmosphere having a particular composition. The difficulty of doing this can be increased if the protective atmosphere must be maintained at a pressure below ambient atmospheric pressure (e.g., as part of a system for subjecting the molten metal to vacuum conditions as mentioned above). Any leakage into the system contaminates the protective atmosphere. And if the entire protective atmosphere must be maintained at a vacuum, the vacuum system may have to handle a relatively large volume of gas, which increases the expense of providing and operating the vacuum.

In view of the foregoing, it is an object of this invention to provide improved and simplified molten metal degassing and filtering methods and apparatus.

It is a more particular object of this invention to provide molten metal degassing methods and apparatus which are capable of dispersing flushing gas more thoroughly in the molten metal.

It is still another object of this invention to provide molten metal degassing methods and apparatus which allow both a protective atmosphere and relatively high partial vacuum to be employed with greater economy and efficiency.

It is yet another object of this invention to provide molten metal degassing and filtering apparatus which can be readily applied to a continuous flow of molten metal, as is generally desirable for a continuous costing operation.

SUMMARY OF THE INVENTION

These and other objects of the invention are accomplished in accordance with the principles of the invention by providing a chamber along which molten metal flows, preferably continuously, toward casting apparatus (e.g., a continuous caster). In order to flow along the chamber, the molten metal must flow through at least one and preferably several ceramic filters. Assuming that several filters are provided, the pore sizes of the filters preferably decrease in the direction of molten metal flow, so that successive filters can remove increasingly small particulate impurities. A flushing gas such as nitrogen is preferably introduced through the flow of molten metal in the chamber in at least one location, preferably several locations along the flow. At each such location the flushing gas is preferably introduced via a porous plug, which disperses the gas into very large numbers of small bubbles. Above each flushing gas introducing location a partial vacuum is maintained in a conduit or column which extends down below the surface of the molten metal. The partial vacuum zones are confined to the above-mentioned columns and can be relatively strong to help pull the flushing gas and other gas impurities up through the molten metal flowing beneath the columns. Elsewhere (i.e., outside the partial vacuum columns) a protective gas atmosphere can be maintained in contact with the surface of the molten metal. The pressure of this protective gas atmosphere can be close to ambient atmospheric pressure or even above ambient atmospheric pressure to reduce contamination of the protective gas by other gas leaking in from outside the chamber.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
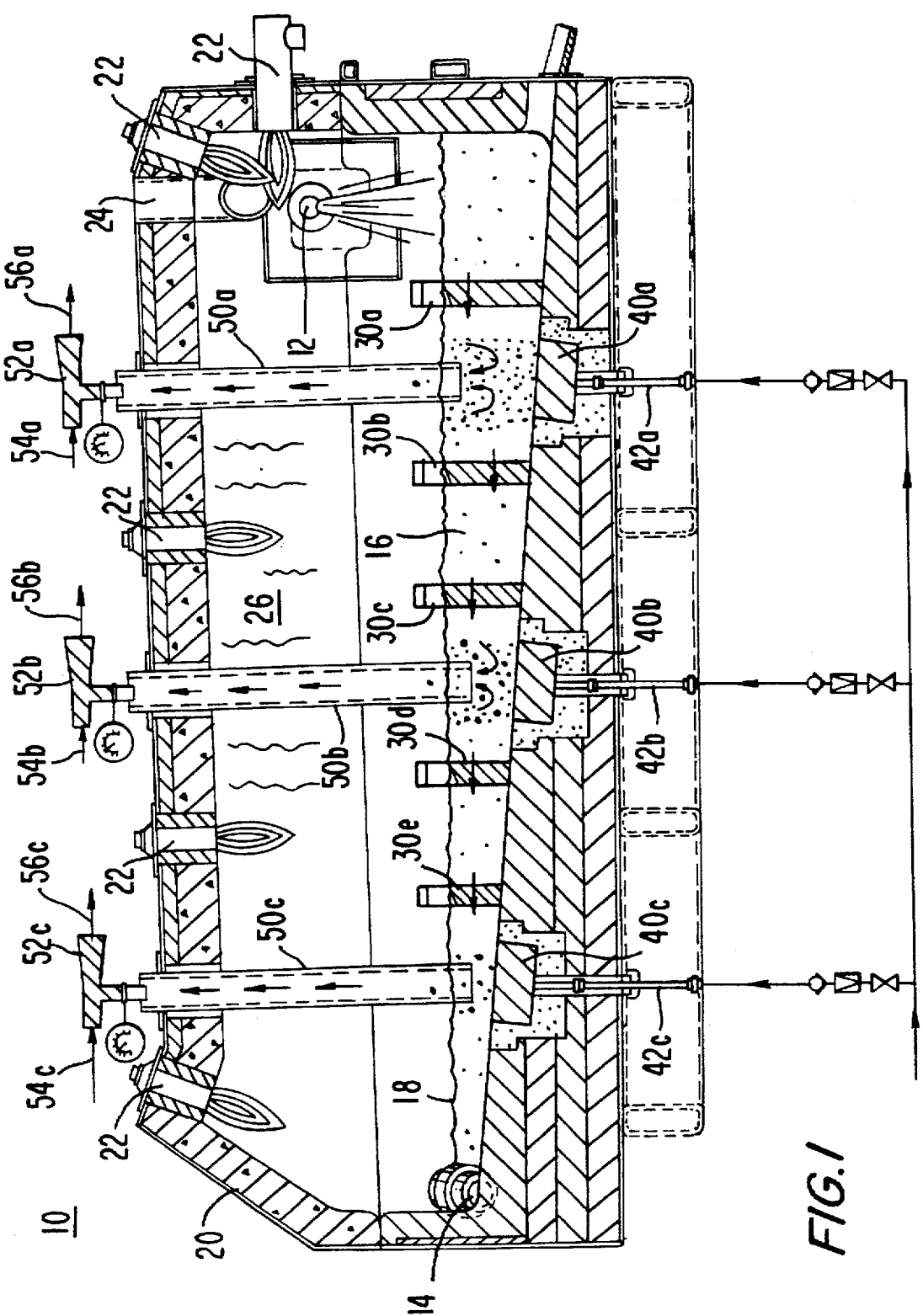
FIG. 1 is a simplified, sectional, elevational view of illustrative molten metal degassing and filtering apparatus constructed in accordance with the invention.

As shown in FIG. 1, an illustrative embodiment of molten metal degassing and filtering apparatus 10 constructed in accordance with this invention includes a chamber 20, the interior of which is preferably made of a refractory material. Molten metal (e.g., copper) to be degassed and filtered enters chamber 20 from a holding furnace (not shown) via pour spout 12 near the upstream end of the chamber. After degassing and filtering in chamber 20, the molten metal exits from the chamber via pour spout 14, which is near the downstream end of the chamber. Pour spout 14 may deliver the molten metal to apparatus (not shown) for conveying the metal to a continuous casting machine. Particularly preferred apparatus for delivering the molten metal from pour spout 14 to a continuous caster is shown in commonly assigned, concurrently filed application No. 08/612,095, which is hereby incorporated by reference herein. The flow of molten metal through chamber 20 is preferably continuous or substantially continuous, as is generally desired for a continuous casting operation.

Gas burners 22 are provided in the roof or cover of enclosed chamber 20 to preheat the chamber to the temperature required for handling molten metal. Burners 22 may also be used to help maintain the temperature of the molten metal in chamber 20. Conduit 24 may be used to supply and/or maintain a desired gaseous atmosphere 26 (composition and pressure) above the free surface 18 of the molten metal in the chamber. For example, this atmosphere may comprise hydrocarbon gases approximately at or somewhat above ambient atmospheric pressure. A hydrocarbon atmosphere protects the metal from oxidation. The use of ambient or slightly elevated pressure prevents air leakage into chamber 20 and allows the chamber to be constructed without elaborate and expensive gas seals. (Surface 18 is sometimes called a "free" surface for convenience herein, even though the gaseous atmosphere above that surface may be controlled in composition and/or pressure.)

In order to flow from the vicinity of upstream pour spout 12 to downstream pour spout 14, the molten metal 16 in chamber 20 must pass successively through a plurality of slabs 30a, 30b, 30c, 30d, and 30e of ceramic filter material. Each of slabs 30 preferably extends all the way across the lower part of chamber 20 and from the bottom of the chamber to a point above the free surface 18 of the molten metal in the chamber. Filters 30 preferably become increasingly fine in the downstream direction along chamber 20 in order to remove increasingly small particulate impurities from the molten metal. For example, filters 30a and 30b may be characterized by surfaces having approximately 10–30 pores per square inch. Filters 30c and 30d may be characterized by surfaces having approximately 25–35 pores per square inch. And filter 30e may be characterized by surfaces having approximately 30–50 pores per square inch. Thus by the time the molten metal has flowed from the upstream end of chamber 20 to the downstream end, it will have been thoroughly filtered to remove particulate impurities by passage through filters 30a–e.

Between filters 30a and 30b, the bottom of chamber 20 includes a plug 40a of porous, preferably refractory material that preferably extends substantially the full width of the chamber. Plug 24a has myriad pores whose cross sectional dimension is preferably in the range from about 40–70 microns. Pressurized flushing gas (e.g., nitrogen) is supplied to plug 40a via conduit 42a. Plug 40a distributes this gas across the width of the floor of chamber 20 and releases the gas into molten metal 16 as countless small bubbles. These bubbles tend to rise in the molten metal, and as they rise, they pick up and/or react with other gas from the metal, thereby helping to degas the metal.

To help promote the rise and removal of gas bubbles as described above, a partial vacuum conduit or column 50a is disposed in chamber 20 above porous plug 40a. Vacuum column 50a (like porous plug 40a) preferably extends substantially across the full width of chamber 20. The open lower end of vacuum column 50a is preferably submerged in the molten metal (i.e., below surface 18). A vacuum eductor 52a is connected to the upper end of vacuum column 50a outside chamber 20. For example, a flow of steam 54a may be applied to eductor 52a to cause the eductor to pull a partial vacuum on the interior of column 50a. The gas thereby withdrawn from vacuum column 50a and the steam used by the eductor may be discharged to the atmosphere as shown by the arrow 56a. Although other vacuum strengths may be used in column 50a, a partial vacuum of approximately 10 inches of mercury has been found to be highly effective in helping to promote the rise of gas bubbles through the molten metal and the removal of those bubbles via the upper part of the vacuum column.

Other porous plugs 40b and 40c (similar to plug 40a) are respectively provided in the bottom of chamber 20 between filters 30c and 30d and downstream from filter 30e. Flushing gas is supplied to each of porous plugs 40b and 40c by conduits 42b and 42c, respectively. As in the case of plug 40a, each of plugs 40b and 40c disperses the flushing gas into myriad bubbles in the molten metal. As these bubbles rise, they pick up and/or react with other gas from the metal, thereby helping to degas the metal. Additional partial vacuum columns 50b and 50c (similar to column 50a) are disposed above plugs 40b and 40c, respectively. As in the case of column 50a, the open lower end of each of columns 50b and 50c is submerged below the surface 18 of the molten metal, and the partial vacuum in the column helps pull bubbles up and out of the metal. Each of columns 50b and 50c has a vacuum eductor 52b or 52c (similar to eductor 52a) connected to its upper portion outside of chamber 20. As in the case of eductor 52a, each of eductors 52b and 52c may be a stream eductor discharging to the atmosphere. The partial vacuum in each of columns 50b and 50c may be similar in strength to the partial vacuum in column 50a (e.g., approximately 10 inches of mercury).

Confining the degassing vacuum to partial vacuum columns 50 has several important advantages. For example, it is much easier to provide gas-tight vacuum columns than it is to make the whole of chamber 20 able to hold a relatively high partial vacuum. Moreover, even if there is some gas leakage into a vacuum column, it is only from protective atmosphere 26, not from the deleterious ambient atmosphere. The vacuum confined to columns 50 does not impede the flow of molten metal through chamber 20 from inlet 12 to outlet 14. Confining the vacuum to columns 50 also allows the bulk of the free surface 18 of the molten metal which is outside columns 50 to be easily blanketed with a protective atmosphere 26 that does not have to be maintained at a vacuum and thus handled by vacuum equipment.

It will be understood that the foregoing is only illustrative of the principles of the invention, and that various modifications can be made by those skilled in the art without departing from the scope and spirit of the invention. For example, the filter pore sizes, the porous plug pore sizes, the protective atmospheric composition, the flushing gas composition, and the partial vacuum pressure mentioned above are particularly advantageous when the metal being handled is copper. However, some or all of these parameters may be changed, if desired, particularly if a different metal is being processed. Similarly, the numbers of filters 30, porous plugs 40, and partial vacuum columns 50 employed may vary, depending on such factors as the extent to which it is desired to degas and filter the molten metal.

The invention claimed is:

1. Apparatus for use in degassing molten metal that will be made to flow continuously through a chamber containing a gaseous atmosphere from an inlet to an outlet comprising:

a plurality of porous plugs disposed in succession in the direction of flow of molten metal when molten metal is made to flow continuously through the chamber and disposed in a lower part of said chamber at locations that will be below molten metal when molten metal is made to flow continuously through the chamber;

a plurality of flushing gas supplies each associated with a respective one of said plurality of porous plugs and each configured to introduce flushing gas into one of said plurality of porous plugs so that each one of said plurality of porous plugs will disperse said flushing gas and release it in the form of myriad bubbles in molten metal when molten metal is made to flow continuously through the chamber;

a plurality of enclosures disposed in succession in the direction of flow of molten metal when molten metal is made to flow continuously through the chamber, each enclosure being associated with and disposed above a respective one of said plurality of porous plugs and each having an open lower end which will extend below an upper surface of molten metal when molten metal is made to flow continuously through said chamber, said porous plugs and said enclosures being intermediate said inlet and outlet and spaced from both said inlet and outlet; and a plurality of sources of reduced gas pressure each connected to the interior or a respective one of said plurality of enclosures at a point which is remote from the open lower end of that enclosure and which will be above molten metal in that enclosure when molten metal is made to flow continuously through the chamber, whereby a reduced gas pressure relative to said gaseous atmosphere will be produced in an upper portion of each of said plurality of enclosures and gas bubbles will be pulled through and out of molten metal to degas the molten metal when molten metal is made to flow continuously through the chamber.

2. The apparatus defined in claim 1 wherein each of said sources comprises:

a steam-operated vacuum educator.

3. The apparatus defined in claim 1 wherein each of said porous plugs comprises a porous refractory material.

4. The apparatus defined in claim 1 wherein each of said porous plugs has pores having transverse dimensions in the range from about 40 to 70 microns.

5. The apparatus defined in claim 1 wherein said flushing gas supplies are configured to supply a flushing gas that comprises nitrogen.

6. The apparatus defined in claim 1 wherein said enclosures and said sources of reduced gas pressure are configured to maintain said reduced gas pressure at approximately 10 inches of memory.

7. The apparatus defined in claim 1 further comprising:

a cover over the chamber outside of said enclosures.

8. The apparatus defined in claim 7 further comprising:

a gaseous atmosphere conduit connected to the interior of said cover configured to supply and maintain said controlled gaseous atmosphere inside said cover which will be in contact with the upper surface of molten metal in the chamber outside of said enclosure when molten metal is made to flow continuously through the chamber.

9. The apparatus defined in claim 8 wherein said gaseous atmosphere conduit is configured to supply and maintain a controlled gaseous atmosphere comprising hydrocarbon gas.

10. The apparatus defined in claim 8 wherein said gaseous atmosphere conduit is configured to maintain said controlled gaseous atmosphere at at least ambient atmospheric pressure.

11. The apparatus defined in claim 1 further comprising at lease one porous filter positioned within said chamber so that said porous filter will be transverse to the flow of said molten metal in said chamber when molten metal is made to flow continuously through the chamber, said porous filter being configured to remove particulate impurities from molten metal flowing through said filter when molten metal is made to flow continuously through the chamber.

12. The apparatus defined in claim 11 wherein said filter comprises a porous ceramic material.

13. The apparatus defined in claim 11 wherein said filter has from about 10 to about 50 pores per surface square inch.

14. The apparatus defined in claim 11 wherein said filter is one of a plurality of similar filters similarly disposed in a succession in the direction of said flow of molten metal.

15. The apparatus defined in claim 11 wherein successive ones of said filters in the direction of said flow have increasing numbers of pores per surface square inch.

* * * * *